Feb. 26, 1952 L. FLEMING 2,586,803
OSCILLATOR
Filed Sept. 10, 1947
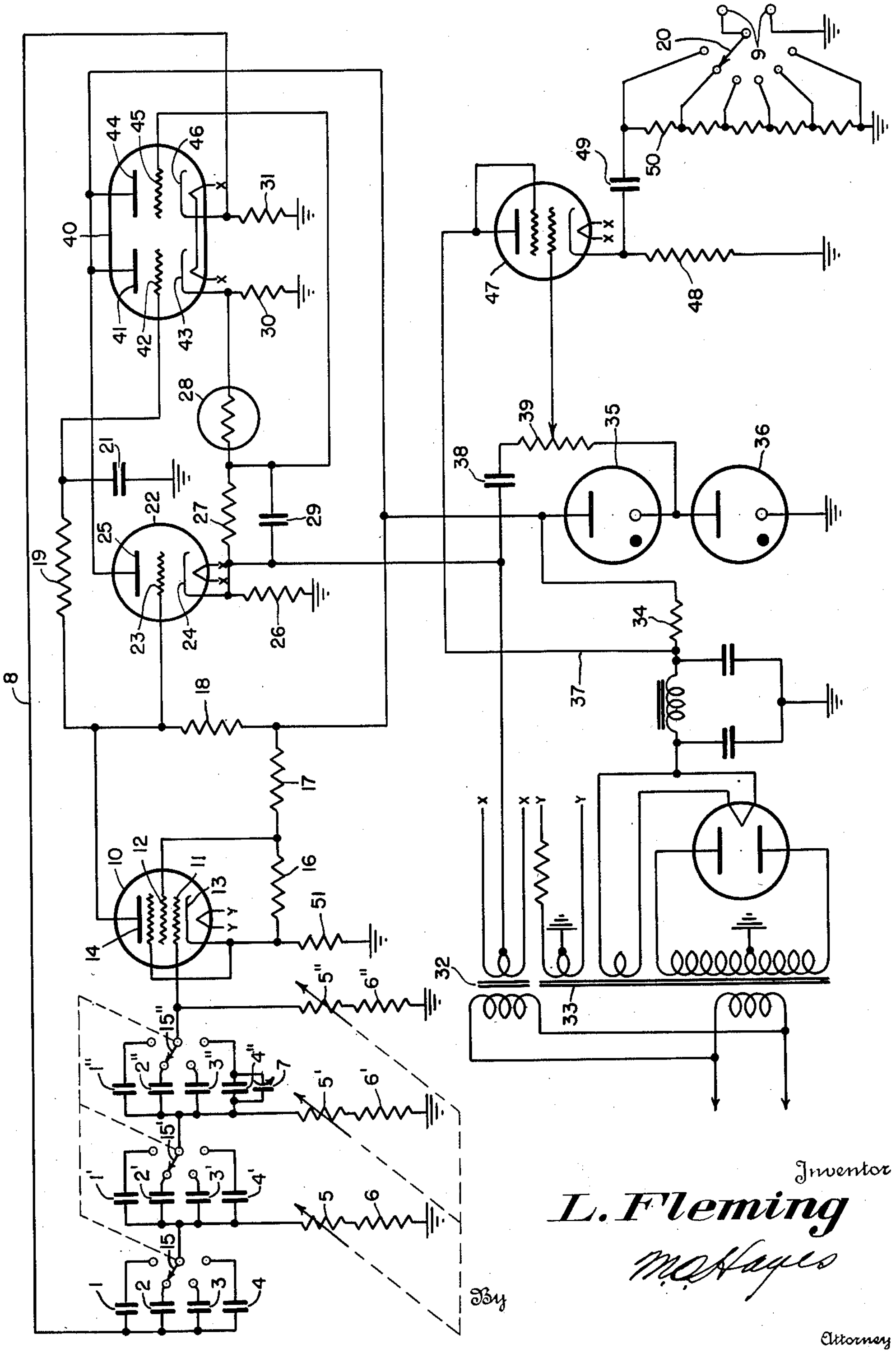
Inventor
L. Fleming
By M. C. Hayes
Attorney Patented Feb. 26, 1952

2,586,803

UNITED STATES PATENT OFFICE 2,586,803

OSCILLATOR

Lawrence Fleming, Falls Church, Va.

Application September 10, 1947, Serial No. 773,284

27 Claims. (Cl. 250—36)

(Granted under the act of March 3, 1883, as amended April 30, 1928; 370 O. G. 757)

This invention relates to improvements in electron discharge tube oscillators of the type in which a phase shifting network is employed to supply a feedback voltage of proper phase to provide for the generation of oscillations. More particularly, the invention contemplates the provision of a variable frequency oscillator of wide frequency range and high stability in which a thermally sensitive element is employed in an arrangement with a plurality of cathode followers for the purpose of maintaining the amplitude of the generated oscillating voltage at a substantially constant value, and contemplates additional improvements in phase shift oscillators not shown in my copending application for Variable Frequency Oscillator, filed November 29, 1945, Serial No. 631,767, now Patent No. 2,565,490 dated August 28, 1951.

Prior art phase shift oscillators have a number of disadvantages and limitations upon their usefulness. One of the foremost of these is large variations in the amplitude of oscillations as the frequency of oscillations is varied over a substantial range. The apparatus of the instant invention substantially obviates this difficulty. In the preferred embodiment hereafter to be described, a frequency range from 0.9 to 10,000 cycles/sec. is provided with an output level which is maintained constant within substantially 10 percent over the entire frequency range. This is accomplished by employing a thermistor element to regulate the amplitude of the voltage generated by the oscillator tube. In the preferred embodiment of the invention, a cathode follower interposed between the thermistor element and the oscillator tube prevents the tube from being loaded by the thermistor, and isolates the tube from changes in the impedance of the thermistor. A second cathode follower tube is employed in a new and improved circuit arrangement to increase the effectiveness of the thermistor by isolating it from the D.-C. component of the anode voltage of the oscillator tube. A third cathode follower is interposed between the thermistor element and the input of the phase shifting network to provide a low and constant impedance source for the network. A fourth cathode follower is employed in the utilization circuit to isolate the oscillator tube from variations in the output load.

Further disadvantages of prior art phase shift oscillators are the generation of distortion due to the presence of stray leading phase shifts, and the creation of instabilities and tendencies to go out of oscillation due to the presence of stray lagging phase shifts, such as those due to shunt circuit capacitances. The circuit of the instant invention minimizes these effects by the provision of a compensating capacitor arrangement.

One of the objects of the invention resides in the provision of a new and improved phase shift oscillator characterized by small variations in the amplitude of the oscillating voltage generated as the frequency of oscillation is varied over wide limits.

Another object is to provide a new and improved phase shift oscillator in which the effects of stray leading and lagging phase shifts are compensated for.

Another object is to provide a new and improved oscillator circuit arrangement for employing a thermistor element to regulate the amplitude of oscillations generated without thereby loading the oscillation generating tube.

A further object is the provision of new and improved means for presenting a low and constant input impedance to the phase shift network.

Other objects and adantages not specifically set forth hereinbefore will be apparent after a perusal of the accompanying description read in conjunction with the drawing in which the single figure thereof is a schematic electrical circuit diagram of a circuit arrangement for practicing the invention in accordance with the preferred embodiment thereof.

Referring now particularly to the drawing, there is shown thereon an oscillation generating electron discharge tube generally designated by the reference numeral 10. Whereas any suitable tube having sufficient amplification may be employed, the tube 10 is preferably a pentode having an anode 14, screen grid 12, control grid 11, and cathode 13, and having the suppressor grid thereof connected to the cathode.

The major phase shift network for controlling the frequency of oscillations comprises three R-C sections, each section comprising a plurality of capacitor elements adapted to be selectively connected in circuit, and a variable resistor element having connected in series therewith a fixed resistor element. The switches which connect the various capacitors in circuit are ganged together, and the variable resistors of the various sections are ganged together so that they may be simultaneously varied from a common control. The capacitor elements of the first network section include capacitors designated by the reference numerals 1, 2, 3, and 4; the capacitor elements of the second network section include capacitors 1', 2′, 3′, and 4′; the capacitor elements of the third section include capacitors 1″, 2″, 3″, and 4″. The switching means before-mentioned for selectively connecting these in circuit are designated 15, 15′, and 15″ in the three sections respectively. The variable resistors of the three sections are designated by the reference numerals 5, 5′, and 5″ respectively, and the fixed resistors associated therewith are designated by the reference numerals 6, 6′, and 6″ respectively. The junction between resistor 5″ and switch 15″ is connected to the before-mentioned control grid 11 of tube 10. The before-described capacitor and resistor elements comprise a series-capacitor parallel-resistance phase shifting network of conventional design which, by suitable choice of component values, may be adapted to supply a phase shift of substantially 180 degrees to the voltage applied to the network through lead 8. The variable capacitor 7 connected across the capacitor 4″ serves as a trimming capacitor and provides means for compensating for the effect of stray capacitance on the highest frequency range of the oscillator.

The aforementioned tube 10 is adapted to generate oscillations when the voltage applied to control grid 11 thereof is substantially 180 degrees out of phase with the voltage at anode 14 thereof. The circuit of tube 10 comprises an anode load resistor 18 connected to a suitable source of anode potential hereafter to be described, a cathode resistor 51 connected from the cathode 13 to ground, and a pair of resistors 16 and 17 connected in series from the cathode 13 to the source of anode potential, the midpoint between resistors 16 and 17 being connected to the screen grid 12. It is noted that tube 10 operates with no by-pass or decoupling capacitors in the circuit thereof, and that the screen grid and bias voltages for the tube 10 are semi-fixed.

It will be apparent to those skilled in the art to which the invention pertains, that in a phase shift oscillator stray phase shifts of either a leading or lagging nature outside the controlling networks effect the operation of the oscillator in an undesirable manner, and require the exercise of care in the circuit arrangement to avoid the undesirable effects. It will be further apparent to those skilled in the art that some means of automatic amplitude control is desirable in phase shift oscillators. The amplification between the input and output terminals of the R-C phase shift network must be maintained at just the value required for oscillation at the desired amplitude. If the amplification falls substantially below this value, oscillation will cease; if it rises substantially above this value, the tube will overload, producing distortion of the wave form. Inequalities or mistracking between corresponding circuit elements in the various legs of the R-C network affect both the frequency of oscillation and the attenuation of the network, which is substantially equal to the gain required for oscillation. Slight changes in supply voltages and aging affect the gain of tube 10. Stray phase shifts outside the R-C network affect both the frequency of oscillation and the gain required for oscillation. Such stray phase shifts are produced by shunt tube and circuit capacitances, by the reactive impedance of the power supply, by decoupling filters if employed, and the like. Accordingly, in the apparatus embodying the instant invention a novel means is provided for automatically maintaining the amplitude of oscillation at a level appropriate to class A, low distortion operation of the tube.

This means comprises a thermistor 28, so connected that it is heated and its A.-C. resistance accordingly lowered, by the A.-C. component only of the oscillations generated by the system. The oscillation voltage is applied from plate 14 of tube 10 through cathode follower 22, to the combination of resistor 27 and thermistor 28 in series. Tube 22 comprises cathode 24, grid 23, and anode 25. The anode 25 is connected to the positive terminal of a source of supply voltage hereafter to be described, and the cathode 24 returned to ground and the negative terminal of the voltage supply through a load resistor 26 in the conventional manner. The other terminal of thermistor 28 is in effect returned to ground in a novel manner to be presently described. The junction between resistor 27 and thermistor 28 feeds the R-C network through a third cathode follower comprising anode 44, grid 45, and cathode 46, and having load resistor 31.

If the amplitude of oscillation increases, the temperature of the thermistor element will rise and its A.-C. resistance will decrease, reducing the percentage of signal fed back to the R-C network. If the amplitude of oscillation decreases, the A.-C. current through thermistor 28 will decrease and its A.-C. resistance will increase, thus increasing the percentage of signal fed back. The time required for a substantial temperature change to occur in thermistor 28 is at least several cycles of the lowest oscillation frequency. Thermistor 28 may be a commercially available thermally sensitive resistor of negative temperature coefficient, comprising a head element of metallic oxides, as is well known in the art.

It is desirable in order to obtain the maximum amplitude regulating action, to have thermistor 28 heated by only the A.-C. component of the signal existing at the anode 14 of tube 10, to the exclusion of the D.-C. component. Such isolation of A.-C. from D.-C. is ordinarily accomplished in prior art devices by means of a simple series capacitor, but in the present case this means is not suitable. For effective operation at the lower frequencies an excessively large capacitor, probably an electrolytic capacitor, would be required. The D.-C. leakage current of such a capacitor would produce undesirable instability of the operating point of the thermistor. Accordingly, the low potential end of thermistor 28 is returned to the cathode of a tube which may be one section of a double triode 40, having cathode 43, grid 42, and anode 41, and having its anode 41 connected to the positive terminal of a source of supply voltage and its cathode 43 returned to the negative terminal (ground) of said source through a load resistor 30, in the conventional manner of a cathode follower. The A.-C. impedance to ground of the output circuit of a cathode follower is known to be quite low. Thus the thermistor amplitude control network 27, 28 extends as is desirable between two points of low A.-C. impedance to ground, the cathode circuit of cathode follower 22 and the cathode circuit of the aforementioned cathode follower having anode 41, grid 42, and cathode 43.

To prevent undesirable D.-C. from flowing through regulating network 27, 28, a novel means is employed to keep cathode 24 and cathode 43 at substantially the same D.-C. potential, this means comprising returning the grid 42 of the left-hand section of double triode 40 to the same point as the grid 23 of triode 22, namely the anode 14 of the oscillator tube 10. Grid 23 is connected directly to the anode 14 and receives signal potential therefrom, delivering the signal through its cathode 24 to the regulating network 27, 28. The grid 42 of the second cathode follower is connected to anode 14 of tube 10 through a resistor 19, and is by-passed to ground through a capacitor 21. Since the grid 42 draws substantially no current, its D.-C. potential is the same as that of anode 14 of tube 10. However, the A.-C. component of voltage present at anode 14 is filtered out by resistor 19 and capacitor 21. Since grid 42 draws no current, resistor 19 can be made of high resistance, permitting a conveniently small value for capacitor 21. Thus the cathode 43 of the second cathode follower is maintained at the same average D.-C. potential as the cathode 24, but with the A.-C. signal removed.

The junction between resistor 27 and thermistor 28, as heretofore mentioned, is the point from which the regulated feedback voltage is fed to the input terminals of the main R-C network. It is well known that the network should preferably be fed from a source whose A.-C. impedance is small compared to the impedance of the network, to prevent changes in the source impedance from affecting the frequency of oscillation. Accordingly, the regulated feedback voltage is fed back to the R-C network through the aforementioned third cathode follower comprising grid 45, anode 44, and cathode 46. Anode 44 is connected to a positive supply source and cathode 46 is returned to ground through the aforementioned load resistor 31. The grid 45 of this cathode follower is connected to the junction between regulating elements 27, 28, and the cathode 46 is connected through lead 8 to the input terminal of the R-C network, namely the common junction of capacitors 1-4.

Capacitor 29 is connected across resistor 27 to compensate for stray phase shifts which occur at high frequencies by reason of the plate to ground capacity of tube 10. Such phase shifts cause a decrease in the amplitude of oscillation at high frequencies and errors in the frequency indicating means associated with switches 15, 15′, and 15″, and variable resistors 5, 5′, and 5″. The value of capacitor 29 is selected to provide the proper compensating effect.

A utilization circuit comprising a fourth cathode follower electron discharge tube designated by the reference numeral 47 is provided. The cathode 24 of tube 22 is connected through coupling capacitor 38 and thence through variable potentiometer 39 to the junction between two voltage regulator tubes 35 and 36 connected in series across the aforementioned source of anode potential. The arm of potentiometer 39 is connected to the control grid of tube 47, which may be of any desired type, in the present instance being a beam power tetrode connected as a triode. The cathode of tube 47 is connected through resistor 48 to ground. The anode of tube 47 is connected through lead 37 to a suitable source of anode potential which may be of the order of 350 volts. The cathode of tube 47 is coupled by capacitor 49 to a tap voltage divider 50, having a switch 20 for selecting the fractional portion of the voltage across the divider to be applied to the oscillator output terminals 9. The aforedescribed circuit constitutes a cathode follower which, as is well known in the art, acts to isolate its input circuit from variation in the load applied to its output circuit.

Whereas any suitable means may be employed for applying energizing potentials to the heaters and anodes of the various tubes, there is provided a filament heating transformer designated by the reference numeral 32 which may be adapted to be energized from a suitable source of A.-C. potential, for example, 110 volts A.-C., 60 cycles, and which heats the heater of electron discharge tube 22, the center tap of the secondary of transformer 32 being connected to the cathode 24 of tube 22. The secondary of transformer 32 also supplies the heaters of tubes 40 and 47 through the terminals $x$—$x$ in any well known manner. A second transformer 33 is provided, having its primary connected in parallel with the primary of transformer 32 and having three secondary windings, one suitable for supplying the heater of tube 10, another suitable for heating the filament of a full wave rectifying tube, and a third adapted to supply a voltage which when rectified and filtered in a conventional manner supplies an anode potential of substantially 350 volts to lead 37. Dropping resistor 34 connects lead 37 to aforementioned voltage regulator tubes 35 and 36 to supply a regulated voltage of substantially 225 volts thereacross. This potential is applied directly to the anodes of tubes 22 and 40, and through resistor 18 to the anode of tube 10.

As stated previously, the switches 15, 15′, and 15″ connect the various capacitors of the phase shifting sections of the network selectively in circuit and are ganged together, while the variable resistor elements 5, 5′, 5″, are ganged together, the capacitors providing a step frequency control, while the variable resistors provide for continuous variation of the frequency within the ranges of the steps. In the apparatus of the preferred embodiment of the invention hereinbefore described, component values are chosen to provide a frequency range from 0.9 cycle to 10,000 cycles per second in four decade ranges, with a dial, not shown, associated with the variable resistor which varies continuously over a ratio of 0.9 to 10. The same dial engraving may serve for all four ranges, and by reason of the aforementioned capacitor arrangement for compensating for the effect of stray phase shifts, the accuracy of the frequency setting may be maintained within 5 percent.

From the foregoing, it will now be apparent that a variable frequency oscillator has been provided which is well adapted to fulfill the aforementioned objects of the invention. While the invention has been described in particularity with reference to the preferred embodiment thereof which gives satisfactory results, it will readily be apparent to those skilled in the art to which the invention pertains, after understanding the invention, that further embodiments, modifications and changes may be made therein without departing from the spirit and scope of the invention, and it is therefore my intention in the claims appended hereto to include all such modifications and equivalents.

The present invention may be manufactured and used by or for the Government of the United States of America for governmental purposes without the payment of any royalties thereon or therefor.

What is claimed as new and desired to be secured by Letters Patent of the United States is:

1. In an oscillator of the character disclosed, in combination, an electron discharge tube having a predetermined amplification factor and having output and input circuits therefor, means including an R-C phase shifting network for applying a feedback voltage from said output circuit to said input circuit in such a manner as to cause the generation of an oscillating voltage in said electron discharge tube, variable impedance means included in said feedback voltage applying means between said phase shifting network and said output circuit and responsive to excursions in said oscillating voltage for controlling the amplitude of oscillation thereof, and means included in said feedback voltage means for isolating said R-C phase shifting network from variations in the impedance of said variable impedance means.

2. In an oscillator of the character disclosed, in combination, an electron discharge tube having a predetermmined amplification factor and having output and input circuits, circuit means for applying a feedback voltage from said output circuit to said input circuit in such a manner as to cause the generation of an oscillating voltage in said electron discharge tube, a thermistor element operatively connected to said output circuit for controlling the amplitude of the voltage therein, means for isolating said output circuit of the electron discharge tube from variations in the impedance of said thermistor element, and means for isolating said input circuit from variations in the impedance of said thermistor element.

3. In an oscillator of the character disclosed, in combination, an electron discharge tube having an amplification factor which exceeds a predetermined value and having output and input circuits, feedback means for applying a feedback voltage from said output circuit to said input circuit in such a manner as to cause the generation of an oscillating voltage in said electron discharge tube, means comprising a thermistor element included in said feedback voltage means and responsive to excursions in said oscillating voltage for controlling the amplitude of said feedback voltage thereby to control the amplitude of oscillation of the oscillating voltage, and capacitive reactive means interposed between said output circuit and said thermistor element for compensating for the effect of stray phase shifts in said feedback means whereby said oscillating voltage generated by said electron discharge tube is maintained at a desired frequency.

4. In an oscillator of the character disclosed, in combination, an amplifier comprising an electron discharge tube and having output and input circuits, circuit means for providing a feedback voltage from said output circuit, means for applying said feedback voltage to said input circuit in proper phase relation with the output voltage of said amplifier to cause the generation of an oscillating voltage in said electron discharge tube, voltage regulating means in said circuit means including a thermistor element responsive to excursions in said oscillating voltage for controlling the amplitude of said feedback voltage thereby to control the amplitude of oscillation of the oscillating voltage means for isolating said output circuit from variations in the impedance of said thermistor element, and reactive means included in said circuit means between said isolating means and said thermistor element and adapted to prevent deviation from said proper phase relation resulting from stray capacitance present in said circuit means.

5. An oscillator according to claim 4 including in addition means for isolating said input circuit from variations in the impedance of said thermistor element.

6. In an oscillator of the character disclosed, in combination, an amplifier including an electron discharge tube and having output and input circuits, circuit means for applying a feedback voltage from said output circuit to said input circuit in proper phase relation with the output voltage of said electron discharge tube to cause the generation of an oscillating voltage in said electron discharge tube, voltage amplitude regulating means included in said circuit means for regulating the amplitude of the said feedback voltage therein, means included in said circuit means and adapted to present a substantially constant impedance to said input circuit thereby insuring the stable operation of said electron discharge tube, and means for interposing reactance into said circuit means in such a manner as to compensate for the effect of stray capacity in said circuit means thereby to maintain substantially constant said proper phase relation.

7. In an oscillator of the character disclosed, in combination, an amplifier having an electron discharge tube and having output and input circuits, circuit means for providing a feedback voltage from said output circuit, said circuit means including thermally sensitive means for regulating the amplitude of said feedback voltage therein, means for applying said feedback voltage to said input circuit in such a manner as to cause the generation of an oscillating voltage in said electron discharge tube, and means included in said voltage applying means for isolating said input circuit from variations in the impedance of said voltage regulating means thereby stabilizing the oscillating voltage generated in said electron discharge tube.

8. In an oscillator of the character disclosed, in combination an electron discharge tube having input and output circuits, circuit means including an R-C network for applying at least a portion of the voltage in said output circuit to said input circuit in predetermined phase relationship thereby to cause the generation of an oscillating voltage in said electron discharge tube, variable impedance voltage regulating means included in said circuit means, electron discharge tube means for isolating said output circuit from changes in the impedance of said voltage regulating means, and electron discharge tube means for isolating said input circuit from changes in the impedance of said voltage regulating means.

9. An oscillator according to claim 8 including in addition a utilization circuit operatively connected to said output circuit and a cathode follower tube for isolating said output circuit from changes in the loading upon said utilization circuit.

10. In an oscillator of the character disclosed, in combination, an amplifier comprising an electron discharge tube and having input and output circuits, a phase shifting network, said phase shifting network having its output connected to said input circuit, voltage amplitude regulating means, a first cathode follower having its output connected to the input of said phase shifting network and its input connected to said voltage regulating means. whereby the voltage impressed thereacross is applied to the first cathode follower, and a second cathode follower having its output applied to said voltage regulating means and its input connected to said output circuit.

11. An oscillator according to claim 10 including in addition a utilization circuit connected to said second cathode follower and adapted to be supplied with at least a portion of the output of said second cathode follower.

12. In an oscillator of the character disclosed, in combination, an amplifier including an electron discharge tube and having input and output circuits, a phase shifting network having the output thereof connected to said input circuit, and circuit means including first and second cathode followers and a thermistor element interconnecting said output circuit and the input of said phase shifting network for providing a feedback voltage thereby to generate an oscillating voltage in said electron discharge tube, said thermistor element being adapted to regulate the amplitude of the voltage in said output circuit, said first cathode follower being interconnected between said output circuit and said thermistor element for isolating said output circuit from changes in the impedance of said thermistor element, said second cathode follower being interconnected between said thermistor element and said phase shifting network for isolating said phase shifting network from changes in the impedance of said thermistor element.

13. An oscillator of the character disclosed comprising, in combination, an amplifier including an electron discharge tube and having output and input circuits, circuit means for providing a feedback voltage from said output circuit, means for applying said feedback voltage to said input circuit in such a manner as to cause the generation of an oscillating voltage in said electron discharge tube, means including a thermistor element operatively connected to said output circuit and responsive to excursions in the voltage in the output circuit for regulating the amplitude of the oscillating voltage generated by said electron discharge tube, means connected to said thermistor element for isolating said output circuit from changes in the impedance of said thermistor element, means connected to said thermistor element for isolating said input circuit from changes in the impedance of said thermistor element, and reactive means connected to said thermistor element for providing a phase shift in the voltage applied thereto thereby to compensate for stray phase shifts occurring in said feedback circuit means and in said feedback voltage applying means.

14. In an oscillator of the character disclosed, in combination, an electron discharge tube having an anode, control grid, and cathode, energizing means for said electron discharge tube adapted to develop a potential difference between the cathode and anode thereof, a cathode follower tube having a control grid, the control grid of said cathode follower tube being connected to the anode of said electron discharge tube, a circuit including a thermistor element and at least one resistor element connected to said cathode follower tube and adapted to have the output of said cathode follower tube applied thereto, a phase shifting network having the output thereof connected to the control grid of said electron discharge tube, and means including a second cathode follower tube for applying at least a portion of the voltage at said thermistor element to the input of said phase shifting network, said phase shifting network being constructed and arranged to provide a voltage at the control grid of said electron discharge tube of the proper phase relationship to provide for the generation of an oscillating voltage in said electron discharge tube.

15. In an oscillator of the character disclosed, in combination, an amplifier having an electron discharge tube and having input and output circuits, an iterative R-C phase shift network comprising three sections interconnected between the input and output circuits and adapted to produce a total phase shift and supply a voltage to said input circuit which provides for the generation of oscillations in said electron discharge tube, variable impedance amplitude regulating means operatively connected to said phase shift network and adapted to maintain the voltage applied thereto at a substantially constant value, a first cathode follower interconnected between said amplitude regulating means and said electron discharge tube, a second cathode follower interconnected between said amplitude regulating means and said phase shift network said cathode followers being adapted to isolate said electron discharge tube and said phase shift network from variations in the impedance of said amplitude regulating means.

16. An oscillator according to claim 15 including in addition a utilization circuit and means for applying a portion of the voltage in the output circuit of said electron discharge tube to said utilization circuit.

17. In an oscillator of the character disclosed, in combination, an amplifier including an electron discharge tube and having input and output circuits, first and second cathode followers, means for applying at least a portion of the voltage in said output circuit to the input of said first cathode follower, means associated with said first cathode follower for regulating the A.-C. output voltage thereof, circuit means for applying the output voltage of said first cathode follower to the input of said second cathode follower, a phase shifting network having the output thereof connected to the input circuit of said amplifier, and circuit means connecting the output of said second cathode follower to the input of said phase shifting means.

18. An oscillator according to claim 17 including in addition a third cathode follower, means for applying a portion variable at will of the output voltage of said first cathode follower to the input of said third cathode follower, and a variable voltage divider connected to said third cathode follower and adapted to have the output voltage of the cathode follower applied thereto, said variable voltage divider being adapted to provide an output voltage having an amplitude determined by the instant setting thereof.

19. In an oscillator of the character disclosed, in combination, means including a phase shift network for generating an oscillating voltage, variable impedance voltage regulating means operatively connected to said generating means and adapted to control the amplitude of the voltage generated thereby, and electron discharge tube means interconnected to said voltage regulating means and said voltage generating means for isolating the input to said voltage generating means from variations in the impedance of said voltage regulating means.

20. In an oscillator of the character disclosed, in combination; an amplifier including an electron discharge tube and having input and output circuits; circuit means interconnecting said input and output circuits for feeding back at least a portion of the voltage in said output circuit to said input circuit in proper phase relationship to provide for the generation of an oscillating voltage in said electron discharge tube, said circuit means including a first cathode follower having the input thereof connected to said output circuit, means for regulating the amplitude of the output voltage of said first cathode follower, a second cathode follower, and connections between said first cathode follower and said second cathode follower for applying the regulated output voltage of said first cathode follower to the input of said second cathode follower, said second cathode follower having the output thereof operatively connected to said input circuit; and a utilization circuit connected to said first cathode follower.

21. An oscillator according to claim 20 including a third cathode follower connected to said amplitude regulating means and adapted to stabilize the operation thereof.

22. An oscillator network comprising an amplifying tube having both D.-C. and A.-C. components of output voltage, thermally sensitive means responsive to said output voltage for regulating the amplitude of oscillation thereof, and means for isolating said thermally sensitive means from the D.-C. component of said output voltage including two electron discharge devices having output electrodes and connected and arranged with respect to said amplifying tube so that the D.-C. potentials on the output electrodes are substantially equal and follow the D.-C. component of the output voltage, said thermally sensitive means being connected between the output electrodes of said discharge devices.

23. In as oscillator of the character disclosed, in combination, an amplifier including an electron discharge tube having a predetermined amplification factor and having output and input circuits, circuit means for applying a feedback voltage from said output circuit to said input circuit in such a manner as to cause the generation of an oscillating voltage in said electron discharge tube, variable impedance means for controlling the amplitude of the voltage in said circuit means, and a pair of electron discharge tubes each having input and output electrodes, said input electrodes being connected to said output circuit so that the D.-C. potentials on said output electrodes are substantially equal to each other and follow the D.-C. component of the voltage of the output circuit, and said variable impedance means being connected between said output electrodes so that the variable impedance means is isolated from said D.-C. component of said output voltage.

24. An oscillator according to claim 23 but further characterized by the provision of means for preventing the A.-C. component of the output voltage from appearing on one of said output electrodes.

25. In an oscillator of the character disclosed, the combination of an electron discharge tube having output and input circuits, circuit means for applying feedback voltage between said output and input circuits in such a manner as to cause the generation of an oscillating voltage in said electron discharge tube, means including a thermistor element included in said circuit means for controlling the amplitude of said feedback voltage therein, and means for isolating said output and input circuits from variations in the impedance of said thermistor element.

26. In an oscillator of the character disclosed, in combination, an amplifier having a predetermined amplification factor and having output and input circuits therefor, means including an R-C phase shifting network for applying a feedback voltage from said output circuit to said input circuit in such a manner as to cause the generation of an oscillating voltage in said amplifier, variable impedance means included in said feedback voltage applying means between said phase shifting network and said output circuit and responsive to excursions in oscillating voltage for controlling the amplitude of oscillation thereof, and means included in said feedback voltage means for isolating said R-C phase shifting network from variations in the impedance of said variable impedance means.

27. In an oscillator of the character disclosed, in combination, an amplifier having a predetermined amplification factor and having output and input circuits, circuit means for applying a feedback voltage from said output circuit to said input circuit in such a manner to cause the generation of an oscillating voltage in said electron discharge tube, a thermistor element operatively connected with said output circuit controlling the amplitude of the voltage therein, means for isolating said output circuit of the amplifier from variations in the impedance of said thermistor element, and means for isolating said input circuit from variations in the impedance of said thermistor element.

LAWRENCE FLEMING.

REFERENCES CITED

The following references are of record in the file of this patent:

UNITED STATES PATENTS

| Number | Name | Date |
|---|---|---|
| 2,268,872 | Hewlett | Jan. 6, 1942 |
| 2,275,452 | Meacham | Mar. 10, 1942 |
| 2,471,262 | Cousins | May 24, 1949 |

OTHER REFERENCES

Ginzton: "Phase-Shift Oscillators," I. R. E. Proceedings, February 1941.